United States Patent [19]
Condon et al.

[11] Patent Number: 5,246,757
[45] Date of Patent: Sep. 21, 1993

[54] ARCHITECTURAL SIGNS WITH RAISED GRAPHICS

[75] Inventors: Robert R. Condon, St. Paul; Daniel P. Pohl, Grant Township, Washington County; Frank T. Sher, St. Paul, all of Minn.

[73] Assignee: Minnesota Mining and Manufacturing Company, St. Paul, Minn.

[21] Appl. No.: 876,057

[22] Filed: Apr. 28, 1992

[51] Int. Cl.⁵ .............................................. A61F 13/02
[52] U.S. Cl. ...................................... 428/40; 40/594; 40/596; 40/615; 40/616; 428/157; 428/161; 428/187; 428/195; 428/203; 428/213; 428/315.5; 428/315.9; 428/331; 428/461
[58] Field of Search ................. 428/40, 203, 195, 213, 428/157, 315.5, 315.9, 331, 161, 187, 461; 40/594, 596, 615, 616

[56] References Cited

U.S. PATENT DOCUMENTS

| | | | |
|---|---|---|---|
| 4,539,256 | 9/1985 | Shipman | 428/315.5 |
| 4,677,010 | 6/1987 | Selwyn | 428/40 |
| 4,804,572 | 2/1989 | Bodrogi | 428/203 |
| 4,833,172 | 5/1989 | Schwartz et al. | 521/62 |
| 4,837,956 | 6/1989 | Dolence | 428/203 |

OTHER PUBLICATIONS

1992 Annual Book of ASTM Standards, "Peel Adhesion of Pressure-Sensitive Tape at 180° Angle", ASTM D 3330-87, vol. 15.09.
3M Brochure, "Technical Data Safety-Walk Antislip Material" 61-5000-7832-6 RPI.
Signs of the Times, "Dealing with the ADA", pp. 76-79, Jan. 1992.
Sign Business, "ADA Signage: A New Business Opportunity", pp. 52-73, Feb. 1992.
"Signage ADA A Dimensional Answer", pp. 1-11.
Sings, Letters & Nameplates, Inc., 1991 "Hand-Cut & Photo-Cut Relief Letters & Logos".
Photo-Cut Graphics, "Photo Chemical Etching".
PMA Photometals Aero-Etch.

Primary Examiner—Ellis P. Robinson
Assistant Examiner—Nasser Ahmad
Attorney, Agent, or Firm—Gary L. Griswold; Walter N. Kirn; Carolyn V. Peters

[57] ABSTRACT

A raised graphic sign comprising (a) a substrate; (b) a base layer adhesively fastened to an upper surface of the substrate; (c) one or more alphanumeric characters, optionally adhesively fastened to the base layer; and (d) an overlay film conformably and adhesively fastened to the upper surface of the base layer and covering the alphanumeric characters is provided, as well as a method to make the raised graphic sign.

14 Claims, 1 Drawing Sheet

ARCHITECTURAL SIGNS WITH RAISED GRAPHICS

TECHNICAL FIELD

This invention relates to architectural signage, particularly to signage with raised graphics and to a method of making such signage.

BACKGROUND OF THE INVENTION

Recently, the Federal Government has adopted the Americans with Disabilities Act (ADA) that requires architectural signage in all buildings and places accessible by the public to contain letters, numerals, and braille characters that are raised off the surface of the sign. The Act specifies that the characters be raised at least 32 mils above their supporting surface, so as to be easily distinguished, even by touch by a disabled person. In addition to complying with the new legislation, the sign should also look aesthetically pleasing and be durable under heavy use conditions.

Mass production of the more commonly used signage affords an economic means to comply with the new legislation. For example, such ADA compliance signage can be fabricated from metals, such as solid brass, copper and magnesium. Such signage is also available that has been fabricated using routing, injection molding, plastic casting, and photo and/or chemical etching techniques. However, there does not presently exist an economic means for providing compliance signs in limited quantities or custom designs.

SUMMARY OF THE INVENTION

Briefly, in one aspect of the present invention, an architectural sign having raised graphics is provided comprising (a) a substrate, (b) a base layer adhesively fastened to one surface of the rigid substrate, (c) one or more alphanumeric characters positioned on a portion of the upper surface of the base layer, (d) an overlay film conformably and adhesively fastened over the upper surface of the sign, such that the overlay film conforms to and seals the alphanumeric character.

In another aspect of the present invention, a method to make an architectural sign is provided comprising the steps (a) adhesively applying a base layer to the upper surface of a substrate; (b) applying one or more alphanumeric characters to the upper surface of the base layer; (c) adhesively applying an overlay film, adhesive side down over the configuration of step (b); and (d) processing the configuration of step (c) in a heat vacuum applicator at a pressure and temperature sufficient to conform the overlay film to the alphanumeric characters and tightly bond the overlay film to the alphanumeric characters and the base layer.

In this application:

"alphanumeric character" means a letter, a numeral, or a graphic, including pictures, symbols, logos, and the like;

"tactile" means an object that can be perceived using the sense of touch;

"signage" means information displayed as text, symbols, or picturegrams that can be read visually or tactilely;

"adhesive" means any substance that is capable of bonding other substances together by surface attachment;

"porous" means lateral porosity;

"base layer" means a layer of material, such as a porous film, a nonporous film, a textured nonporous film, a non-woven material, paper stock, and the like;

"accessible" means accessibility of the location by disabled persons.

DESCRIPTION OF THE PREFERRED EMBODIMENT(S)

Figure 1:
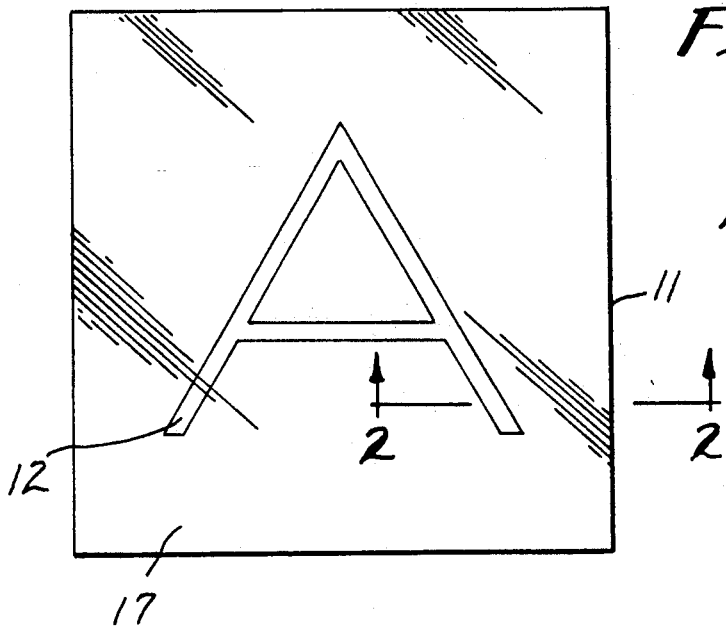
FIG. 1 is a plane view of a sign face of the present invention.

Referring now to the drawing, FIG. 1 illustrates a sign face 10 having a sign base 11 and an alphanumeric character 12. With reference to the cross-sectional illustrated in FIG. 2, sign base 11 comprises a substrate 13, overlaid with a base layer 15 adhesively (first adhesive layer 14) fastened to substrate 13. Alphanumeric character 12, with an optional second adhesive layer 18 are positioned on a portion of base layer 15. Once all the alphanumeric characters 12 (only one is shown for simplicity) are positioned on base layer 15, an overlay film 17 is conformably and adhesively (third adhesive layer 16) fastened over the upper surface of the sign 10, such that overlay film 17 conforms to and seals alphanumeric character 12.

Figure 2:
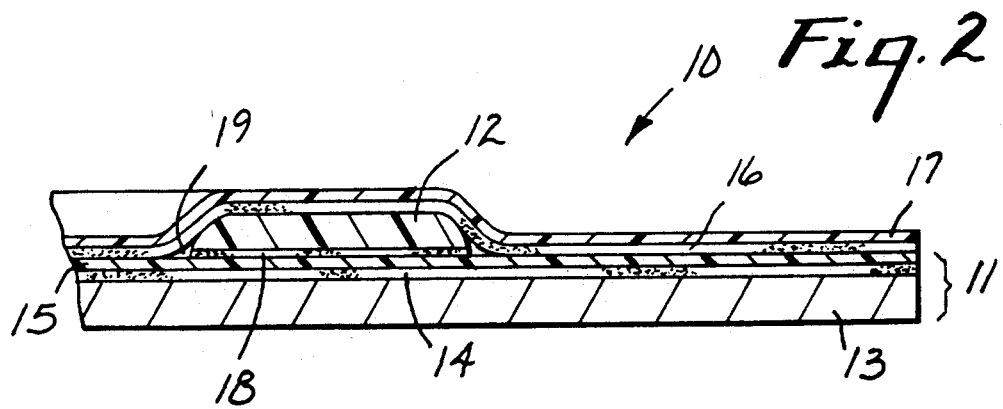
FIG. 2 is a cross section of the sign face of FIG. 1 at 2—2.
Figure 3:
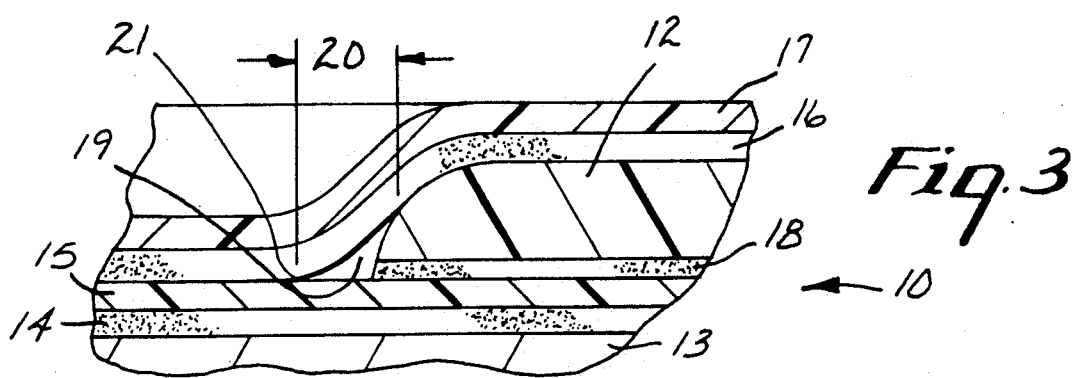
FIG. 3 is an enlargement of air pocket 19 illustrated in FIG. 2.

Referring to FIGS. 2 and 3, an air pocket 19 is created when overlay film 17 is conformed to the sign face 10. In the present invention, the size of air pocket 19 is determined as average maximum lift, measured by the length (represented by 20) from the edge of alphanumeric character 12 to the point (represented by 21) where adhesive layer 16 of overlay film 17 contacts with base layer 15. Preferred overlay films generally have an average maximum lift of less than 2 millimeters.

Suitable substrates include rigid materials, such as metal, wood, plastics, ceramics, or laminates thereof. Suitable substrates may also include flexible materials, such as liners, plastic cover film, heavy gauge plastic, and the like. For example, the sign face can be fabricated on a release liner substrate, and applied to a permanent substrate, such as a wall or pre-existing sign blank, by removing and discarding the release liner. Preferably, the substrates are non-porous. However, it is within the scope of the present invention to utilize a substrate that is porous that is, has lateral porosity thus bypassing the need for a porous base layer, as described below.

While not intending to be bound by theory, it is believed the mechanism of lateral transport of air may be important in providing a tight, conformal adherence of the overlay film over the alphanumeric characters. This mechanism may involve partial evacuation or redistribution of entrapped air pockets between the base layer and the overlay film. Thus, an aspect of the present invention, is the ability to laterally transport and evacuate air between the two layers. This may be accomplished via several different routes.

For example, one method of providing lateral transport of the trapped air, is to have a base layer that is laterally porous, that is, a "porous" material with laterally connected pores (interstices), or relatively impermeable surface-textured (roughened) films having laterally connected surface channels. An alternative method for lateral transport between the overlay film and the base layer is to provide a textured adhesive layer on the undersurface of the overlay film or to provide a textured undersurface of the overlay film itself.

Generally, a porous base layer added to the substrate is preferred. For example, using a porous base layer material, the vacuum pressure generated in a heat vacuum applicator is able to pull the film down to conform tightly around the alphanumeric characters. While not intending to be bound by theory, it is believed that any trapped air is allowed to escape out the edges of the base layer material, resulting in a tight intimate bond of the overlay film around the alphanumeric characters, thereby minimizing any air pockets around the alphanumeric characters, as well as any other air bubbles that may be trapped on the surface of the sign face.

Suitable base lauer materials include open-cell, microporous films. For example, a suitable film is one comprising essentially linear ultrahigh molecular weight polyolefin that is essentially linear ultrahigh molecular weight polyethylene, filled with a finely divided particulate substantially water insoluble siliceous filler, having a weight ratio of the filler to polymer in the mixture of from about 1:1 to 9:1. Such films are described in U.S. Pat. No. 4,833,172 and such description is incorporated herein by reference.

Suitable base layer materials also include microporous materials comprising polyethylene, polypropylene-polyethylene copolymers, polyethylene terephthalate, polycarprolactam, polyvinylidene fluoride, and polybutylene terephthalate. Such films are described in U.S. Pat. No. 4,539,256 and such description is incorporated herein by reference.

Base layer materials that are also within the scope of the present invention are porous materials such as fibrous woven materials or fibrous nonwoven materials, such as, for example spunbonded webs, air-laid webs, or melt-blown microfiber web; paper products, and the like.

Through-porosity (Gurley porosity) is one means of identifying potential porous base layer materials. The porosity of such base layer materials without an adhesive backing layer are typically less than 20,000 seconds per 50 cubic centimeters. However, relatively smooth, films made porous with spaced perforations or pinholes that are not laterally connected tend to be insufficient as base layer materials.

Suitable porous base layer materials can be characterized as having a network of interconnected micropores (interstices). The pores may be analyzed by scanning electron microscope of the surface and cross-section. A typical property of many laterally porous base layer materials is the ability to laterally wick some types of solvent. For example, this property could be observed by applying a suitable dyed solvent onto the material and observing the lateral migration of the dyed solvent.

An interesting feature of some base layer materials is that, after heating, the material will become transparent allowing the color of the substrate to be visible. Further, different films or coatings can be added to the sign face prior to application of the overlay film to add or enhance the color and/or color contrast of the sign. Although not a requirement for the present invention, the new ADA legislation recommends a color contrast differential of approximately 70%.

The alternative method for lateral transport between the overlay film and the base layer provides a textured adhesive layer on the undersurface of the overlay film or provides a textured undersurface of the overlay film itself. The adhesive layer coated onto the overlay film can be structured or textured as is known in the art. Alternatively, the overlay film, as described below can be textured. Typically, when the overlay film is textured, the composition of the overlay film is such that no separate and distinct adhesive layer is needed, and the adhesive fastening of the overlay film to the base layer is accomplished by a thermoplastic adhesive bond.

The signage of the present invention is typically laminated using two adhesive layers, and optionally three adhesive layers. The first adhesive layer between the substrate and the base layer, and the third adhesive layer between the base layer and the overlay film ideally, comprise an adhesive having a high adhesive strength. The optional, second adhesive layer between the alphanumeric characters and the base layer can comprise an adhesive having a lower adhesive strength, although for ease of fabrication, all three layers may be the same adhesive system. Suitable adhesives typically have a 180° peel test strength of at least 0.5 lb/inch as described in ASTM D 3330-87 (Peel Adhesion of Pressure-Sensitive Tape at 180 Degrees Angle). The preferred adhesives are pressure sensitive adhesives, that is adhesive that develops sufficient bonding power by applying only a light pressure.

The adhesive systems include pressure sensitive adhesives, thermoplastic (heat activated), cross-linking adhesive system, or other types of adhesive systems to bond the various layers to provide more durability. As described above, an overlay film can be fastened to the base layer using a thermoplastic adhesive bond. Optionally, an adhesion enhancer or primer may be applied to one or both bonding surfaces to enhance adhesion.

A three-dimensional alphanumeric character can be fabricated using film materials having a thickness of 10 to 50 mils, preferably 10 to 40 mils, wherein the material can withstand the operating conditions of a heat vacuum applicator (HVA) (Dayco Industries, Panaflex ™ II Systems Applicator). Standard operating conditions for the HVA include temperatures in the range of 68° to 250° F. and vacuum gauge readings of 20 to 30 inches of mercury, preferably temperatures in the range of 150° to 250° F. and vacuum gauge readings of 23 to 26 inches of mercury. Using filled rubber material (for example, commercially available from the 3M under the trade name "Letterperfect" No. 511) advantageously permits fabrication of the alphanumeric characters on an electronic cutter. Alternatively, other materials can be used and cut using cutting techniques well known in the art. Custom cutting permits flexibility in producing the characters, as well as customs logos or designs. Alternatively, commercially available alphanumeric characters, such as polymeric cast, precut or preformed characters, including Braille may be incorporated into the signage by positioning the character or graphic onto the base layer and then applying the overlay film. In another embodiment of the present invention, the Braille can be positioned on the substrate prior to fastening the base layer onto the substrate.

The overlay film provides durability and optionally, dirt and vandal resistance. The overlay film is conformable under processing conditions and has a thickness in the range of 0.25 mil to 15 mils, preferably in the range of 0.5 mil to 10 mils, more preferably in the range of 1 mil to 6 mils. Preferably, the overlay film is conformable at temperatures in the range of 150° to 250° F. The overlay film can be transparent, translucent, or opaque.

Further, it is often desirable for the overlay film to have a matte finish. For ADA application, the overlay film is preferably a colorless, transparent, matte-finish film. Suitable overlay films have an elongation of greater than 50% at room temperature. However, elongation of the film can be affected by heat when used in the heat vacuum applicator. Examples of suitable overlay films include but are not limited to vinyl (for example, commercially available from 3M as Scotchcal TM 3669 or 210-314 film), polyvinylidene fluoride acrylic laminate film, polyethylene, cast polypropylene, cast polystyrene, and the like. Further, the overlay film can be a film, that once it is conformed can be cured or hardened, thus imparting an increased durability to the sign face.

A method to make the architectural signs of the present invention comprise the steps (a) adhesively applying a base layer to an upper surface of substrate; (b) applying one or more alphanumeric characters to the upper surface of the base layer; (c) adhesively applying an overlay film, adhesive side down over the configuration of step (b); and (d) preferably, processing the configuration of step (c) in a heat vacuum applicator at a vacuum gauge reading in the range of 20 to 30 inches of mercury and a temperature in the range of 150° to 250° F. conforming the overlay film to the alphanumeric characters and tightly bonding the overlay film to the alphanumeric characters and the base layer.

An alternative method is to process the configuration of step (c) in a hydraulic press, wherein the overlay film is conformed at room temperature under high pressure, for example pressures in the range of 5,000 to 30,000 psi. To protect the upper surface of the sign face, a conformable pad is positioned over the sign face prior to processing in the hydraulic press. High pressure lamination can also be carried out at elevated temperatures, for example, up to 250° F., thus permitting a reduction in operating pressure.

It is also contemplated that the configuration of step (c) of a sign of the present invention can be hand laminated, using laminating aids such as a stylus, hand squeegee, rivet brush applicator, and the like.

Objects and advantages of this invention are further illustrated by the following examples, but the particular materials and amounts thereof recited in these examples, as well as other conditions and details, should not be construed to unduly limit this invention. All materials are commercially available or known to those skilled in the art, unless otherwise stated or apparent.

EXAMPLES

All examples designated with a "C" are comparative examples.

Gurley Porosity

The through-porosity of the base layer without an adhesive backing layer may be measured according to ASTM-D-726-58, Method A, by using a Gurley densimeter (Model 4110) to measure the time in seconds to pass 50 cubic centimeters of air through the film. Through-porous films generally have a Gurley porosity of less than 20,000 seconds per 50 cubic centimeters of air through the film.

Airflow Measurements

The ability of a textured sheet to laterally transport air between a base layer and contacting metal lands is measured according to TAPPI (Technical Association of Pulp and Paper Industry) test method T538 om-88 using a Sheffield Smoothness Tester. Airflow is reported in Sheffield units. Relatively nonporous and uniformly textured sheets generally have higher Sheffield units relative to smooth nonporous control bases.

Air Pocket Test

The average maximum length (20) of separated areas between overlay film 17 and the base layer 15 (referring to FIG. 3) in a processed laminate were determined and reported as average maximum lift. Preferred materials afforded average maximum lifts of less than about 2 millimeters.

Visual Rating

The laminates were rated according to the following scale:
1. poor, large entrapped air pockets across all alphanumeric characters;
2. slight conformability, extensive entrapped air pockets;
3. some conformability, moderate entrapped air pockets;
4. improved conformability, small entrapped air pockets; and
5. excellent conformability, visually insignificant air pockets.

EXAMPLES 1-5

Raised graphics sign constructions were prepared as follows: Base layers for Examples 1-5 were open-celled microporous, air permeabl films as summarized in Table 1. The base layers were backed with a pressure sensitive adhesive layer and bonded to a 1.5 millimeter gray-painted aluminum control substrate. The raised characters were cut from adhesive-backed filled-rubber material (available from 3M under the trade name "Letter-perfect" No. 511) using an electronic cutter. The characters where applied to the upper surface of the base layer. A colorless, transparent overlay film having a tacky pressure sensitive adhesive layer (available from 3M under the trade name "Scotchcal" No. 3669) was placed, adhesive side down, over the construction and processed in a heat vacuum applicator (available from Dayco Industries, Panaflex# II Systems Applicator) at a vacuum gauge reading of approximately 23 inches of mercury and a temperature of 250° F. for 8 minutes. A raised graphic construction was produced having 45 mil high relief characters on the base layer. With the exception of Example 5, visually and tactilely useful signs resulted. Example 5 was a control base. Examples 1-5 were evaluated using the Air Pocket Test.

The results are summarized in Table 1 and illustrate excellent visual ratings for sign constructions using a microporous film.

TABLE 1

| Ex | Base layer | Gurley Porosity (sec/50 cc) | Sheffield Units | Average Maximum Lift (mm) | Visual Rating |
|---|---|---|---|---|---|
| 1 | 4.5 mil vinyl[a] | 7 | — | <0.5 | 5 |
| 2 | 5.5 mil polypropylene[b] | 130 | — | <0.5 | 5 |
| 3 | 2 mil high density polyethylene[b] | 16 | — | 2.2 | 4 |
| 4 | 7 mil polyethylene[c] | 1300 | — | 0.5 | 5 |

TABLE 1-continued

| Ex | Base layer | Gurley Porosity (sec/50 cc) | Sheffield Units | Average Maximum Lift (mm) | Visual Rating |
|---|---|---|---|---|---|
| C5 | None | 1[d] | 30 | 8.8 | 1 |

[a]"microporous film available from Mitsubishi;
[b]microporous film as described in U.S. Pat. No. 4,539,256;
[c]microporous film available from PPG Industries under the trade name of "Teslin"; and
[d]impermeable

EXAMPLES 6-10

Raised graphics sign constructions were made according to Examples 1-4, except the base layer was selected from other air permeable materials that were backed with pressure sensitive adhesive. The overlay film was the same film as used in Examples 1-4. The examples were evaluated using the Air Pocket Test. The results are summarized in Table 2.

TABLE 2

| Ex | Base layer | Gurley Porosity (sec/50 cc) | Sheffield Units | Average Maximum Lift (mm) | Visual Rating |
|---|---|---|---|---|---|
| 6 | 12.5 mil white spunbonded polyester[a] | 0.1 | — | 1 | 5 |
| 7 | 6 mil white spunbonded nylon[b] | 0.2 | — | 0.9 | 5 |
| 8 | 9.5 mil fluorescent pink tag board | 500 | — | 0.7 | 5 |
| 9 | 6 mil red construction paper | 8 | — | 0.5 | 5 |
| C10 | vinyl film with perforations spaced 0.7 cm apart[c] | d | 75-160 | 3.9 | 2 |

[a]"Reemay" 2221 available from Reemay, Old Hickory, TN;
[b]"Cerex" 1.5 oz. Type 23 available from Fiberweb North America Inc.;
[c]Scotchcal ™ 5690 film available from 3M; and
[d]Gurley porosity of the nonperforated version greater than 277,000 sec/50 cubic centimeters.

EXAMPLES 11-23

Raised graphic sign constructions were made according to the method described in Examples 1-4, except the base layer was selected from relatively air-impermeable materials having a backing of pressure sensitive adhesive. The overlay film was the same film as used in Examples 1-4. The examples were evaluated using the Air Pocket Test. The results are summarized in Table 3. The results show a variety of transparent, translucent, and colored materials with sufficient surface roughness are useful in practicing the present invention. With transparent or translucent base layers, the background color was the gray color of the base plate. Some of the comparative examples, as indicated, showed poorer construction integrity and visual appearance because of the poor bond between the overlay film and the base layer.

TABLE 3

| Ex | Base Layer | Sheffield Units | Average Maximum Lift (mm) | Visual Rating |
|---|---|---|---|---|
| 11 | gray 100 grit sandpaper[a] | >430 | 1 | 5 |
| 12 | gray 180 grit sandpaper[a] | >430 | 1 | 5 |
| 13 | tan 220 grit sandpaper[b] | >430 | 1.2 | 5— |
| C14 | gray 600 grit sandpaper[a] | 430 | 6.2[j] | 1[j] |
| 15 | Safetywalk ™ Antislip clear resilient (fine)[c] | >430 | <0.5 | 5 |
| 16 | Safetywalk ™ Antislip white resilient (fine)[c] | >430 | <0.5 | 5 |
| 17 | Safetywalk ™ Antislip black resilent (medium)[c] | >430 | <0.5 | 5[m] |
| 18 | Safetywalk ™ Antislip gray resilient (medium)[c] | >430 | <0.5 | 5[k] |
| 19 | 14 mil vinyl work organizer[d] | 385 | 1.2 | 5— |
| 20 | brown vinyl FET-143 coarse texture film[e] | >430 | 2.6 | 4 |
| C21 | gray vinyl film[f] | 395 | 5.5 | 3 |
| C22 | frosted crystal vinyl film[g] | 395 | 7.5 | 1[j] |
| C23 | dusted crystal finyl film[h] | 135 | 7.5 | 1 |

[a]Wetordry ™ sandpaper available from 3M;
[b]210N sandpaper available from 3M;
[c]available from 3M;
[d]available from W.J. Saunders, Inc.
[e]Controltac ™ film available from 3M;
[f]P3008 Scotchcal ™ film available from 3M;
[g]210-324 Scotchcal ™ film available from 3M;
[h]210-314 Scotchcal ™ film available from 3M;
[j]poor bond between the overlay film and the base layer;
[k]raised alphanumeric characters were 33 mils high; and
[m]raised alphanumeric characters were 36 mils high.

EXAMPLES 24-29

Raised graphics sign constructions were prepared according to the method described in Examples 1-4, except various types of overlay films and adhesive backing layers were used. The base layer was the same as described in Example 4. Example 29 had no adhesive layer on the thermoplastic overlay film. The examples were evaluated using the Air Pocket Test. The results are summarized in Table 4. The examples indicate that a variety of overlay films conformable at the process temperature are useful. Further, other types of adhesive backing layers, such as those that are bondable at the process temperature, are useful in the present invention.

TABLE 4

| Ex | Overlay Film | Adhesive Type | Average Maximum Lift (mm) | Visual Rating |
|---|---|---|---|---|
| 24 | white vinyl film[a] | thermal | 0.8 | 5 |
| 25 | black vinyl film[a] | thermal | 0.7 | 5 |
| 26 | dusted crystal vinyl film[b] | PSA | 0.6 | 5 |
| 27 | transparent vinyl film[c] | PSA | 1 | 4-5 |
| 28 | 14 mil vinyl work organizer[d] | PSA | 1.6 | 4 |
| 29 | 5.5 mil unoriented transparent styrene[e] | none | 1.8 | 4 |

[a]650 Scotchcal ™ film available from 3M;
[b]655 Scotchcal ™ film available from 3M;
[c]210-314 Scotchcal ™ film available from 3M;
[d]available from W.J. Saunders, Inc. (without adhesive); and
[e]available from Westlake Plastics Co., Lenni, PA

EXAMPLE 30

A raised graphic sign construction similar to Example 3 was prepared using the overlay film of Example 26. The sign was placed in a 291° F. oven for 5 minutes, at which point the white background base layer became transparent, and changed the background color to the gray color of the substrate. In similar fashion, a stainless steel substrate was used to afford a raised graphic sign with a shiny metallic background.

EXAMPLE 31

A raised graphic sign construction was made having alphanumeric characters positioned directly on the substrate, that is, without a base layer. The overlay film was a 2 mil clear vinyl film having a textured thermally-activated adhesive layer (Sheffield No.>430) on the under side of the overlay film. The processed sign had a visual rating between 4 and 5. A 1.1 mm average maximum lift was determined using the Air Pocket Test.

EXAMPLE 32

A raised graphic sign construction was made according to the procedure of Examples 1–4, except only the adhesive backing layer was applied as the base layer on the substrate. The textured film used as the base layer of Example 28 without adhesive backing, was used as the overlay film. The processed sign had a visual rating of about 4. A 1.8 mm average maximum lift was determined using the Air Pocket Test.

EXAMPLE 33

A raised graphic sign construction was made according to Example 4, except the substrate was a Post-it TM Bulletin Board 558, available from 3M. After processing, the substrate was peeled from the sign laminate to produce a pressure sensitive adhesive back raised graphic sign construction. This construction could be adhered to other desirable substrates or surfaces.

EXAMPLE 34

A sign construction was prepared according to Example 6 with the following modifications: the base layer was black-dyed "Reemay" 2024 spunbonded polyester with a laminated PSA adhesive backing layer. The overlay film of Example 26 was used. A foam sponge and a computer mouse pad were place on top of the overlay film as processing aids, and the construction was processed in a Preco hydraulic press at 25,000 psi at room temperature. The laminate was then heated to 212° F. The matte black sign construction having 35 mil raised light green characters had an excellent visual rating of 5. The average maximum lift as determined using the Air Pocket Test was less than 0.5 mm.

EXAMPLE 35

A sign construction was prepared using the materials of Example 4. The construction was processed in a hydraulic press according to the procedure described in Example 34 for 20 minutes at room temperature. A sign construction with 42 mils raised characters had a visual rating of 4. The average maximum lift, as determined using the Air Pocket Test was 1.5 mm.

EXAMPLES 36–39

To ascertain the relative durability of several sign constructions as they relate to cleanability and vandal resistance, the following mechanical rub test was used.

A wood block was sized and fitted into the standard metal holder assembly of a Gardner Abrasion Tester (Model AG 8100). A Faber Castell TM Pink Pearl Eraser 101 was attached to the bottom of the block with a screw such that the 25 mm wide pointed end of the eraser extended at about a 50 degree angle from horizontal downwards and away from the block. The pointed end projected lower than the base of the eraser. The total assembly weight was 375 grams. Test panels with a one inch high, 35 mils thick graphic "M" character adhered thereto (using 3M brand 511 tape) were taped onto the stage of the tester such that the pointed leading edge of the abrasive pick hit the raised character edge in the forward direction. A cycle is one forward and one backward stroke. The results are summarized in Table 5. The system utilizing the protective overlay film (available from 3M, as "Scotchal" No. 210-214 film) provided excellent anchorage of the characters to the sign (base layer) and also protected the sign face from abrasion.

TABLE 5

| Ex. | Base Layer | Overlay Film | Cycles | Failure Mode |
|---|---|---|---|---|
| C36 | vinyl film[a] | None | <10 | adhesive delamination of character; pitting of base layer |
| C37 | vinyl film[a] | vinyl film character on top of raised character[c] | 150 | adhesive delamination of vinyl film character |
| C38 | polyethylene[b] | None | 200 | wear at edge of character; pitting of base |
| 39 | polyethylene[b] | vinyl film[d] | 200 | None |

[a]black translucent adhesive backed film available as No. 3630-22 "Scotchcal" brand marking film from 3M;
[b]available from PPG Industries, under the trade name of "Teslin";
[c]adhesive backed film available as No. 220-53 "Scotchcal" brand marking film from 3M; and
[d]adhesive backed film available as No. 210-314 "Scotchcal" brand marking film from 3M.

Various modifications and alterations of this invention will become apparent to those skilled in the art without departing from the scope and spirit of this invention, and it should be understood that this invention is not to be unduly limited to the illustrative embodiments set forth hereinabove.

We claim:

1. A raised graphic sign comprising:
   (a) a substrate;
   (b) a laterally porous base layer adhesively fastened to the substrate;
   (c) one or more alphanumeric characters having a height of least 10 mils, optionally adhesively fastened to the base layer; and
   (d) an overlay film conformably and adhesively fastened to the base layer and covering the alphanumeric characters and has an average maximum lift of the overlay film from the base layer of less than 2 mm.

2. The raised graphic sign according to claim 1, wherein the substrate is selected from the group consisting of a rigid material and a flexible material.

3. The raised graphic sign according to claim 2, wherein the rigid material is selected from the group consisting of and metal, wood, plastic, ceramics, and laminates thereof.

4. The raised graphic sign according to claim 2, wherein the flexible material is selected from the group consisting of a liner, plastic film, and heavy gauge plastic.

5. The raised graphic sign according to claim 1, wherein the substrate is a release liner.

6. The raised graphic sign according to claim 1, wherein the porous film is essentially a linear ultrahigh molecular weight polyolefin filled with a finely divided particulate substantially water insoluble siliceous filler, having a weight ratio of the filler to polymer in the mixture of from about 1:1 to 9:1.

7. The raised graphic sign according to claim 1, wherein the overlay film is selected from the group consisting of transparent, translucent, and opaque.

8. The raised graphic sign according to claim 7, wherein the overlay film is a transparent film.

9. The raised graphic sign according to claim 8, wherein the transparent film is a curable film.

10. The raised graphic sign according to claim 8, wherein the transparent film is a matte finish vinyl.

11. The raised graphic sign according to claim 1, wherein the sign is processable to induce transparency of the base layer.

12. A raised graphic sign comprising:
(a) a metallic substrate;
(b) a porous film of an essentially linear ultrahigh molecular weight polyolefin filled with a finely divided particulate substantially water insoluble siliceous filler, having a weight ratio of the filler to polymer in the mixture of from about 1:1 to 9:1 base layer coated with a layer of pressure sensitive adhesive;
(c) one or more alphanumeric characters having a height of at least 10 mils fabricated from a filled rubber material undercoated with a layer of pressure sensitive adhesive; and
(d) a matte finish vinyl film undercoated with a pressure sensitive adhesive, conformably fastened to the upper surface of the sign and having an average maximum lift from the base layer of less than 2 mm.

13. An architectural sign comprising a porous base layer, one or more alphanumeric characters positioned on an upper surface of the base layer and having a height of at least 10 mils, and an overlay film adhered onto the base layer so as to cover and tightly conform to the alphanumeric characters and said overlay film has an average maximum lift of less than 2 mm.

14. An architectural sign comprising a base layer having interconnected pores such that air can be drawn from the top of the base layer through the sides of the base layer, one or more alphanumeric characters positioned on an upper surface of the base layer and having a height of at least 10 mils, and an overlay film adhered onto the base layer so as to cover and tightly conform to the alphanumeric characters and said overlay film has an average maximum lift of less than 2 mm.

* * * * *

UNITED STATES PATENT AND TRADEMARK OFFICE
CERTIFICATE OF CORRECTION

PATENT NO. : 5,246,757
DATED : September 21, 1993
INVENTOR(S) : Condon et al.

It is certified that error appears in the above-identified patent and that said Letters Patent is hereby corrected as shown below:

Col. 3, line 17, Replace "lauer" with --layer--

Col. 4, line 25, Insert --an-- before "adhesive"

Col. 6, line 33, Replace "permeabl" with --permeable--

Col. 6, line 46, Replace "#" with --$^{TM}$--

Col. 8, Table 3, C23, Replace "finyl" with --vinyl--

Col. 9, line 38, Replace "place" with --placed--

Col. 10, line 43, Insert --at-- before "least"

Col. 10, line 55, Delete the first "and"

Signed and Sealed this

Fifth Day of July, 1994

Attest:

BRUCE LEHMAN

*Attesting Officer*  *Commissioner of Patents and Trademarks*